Nov. 10, 1964 E. A. WHITE, JR 3,156,433
MAGNETOHYDRODYNAMIC GENERATOR
Filed Jan. 10, 1962 3 Sheets-Sheet 3

INVENTOR.
EDWARD A. WHITE JR.
BY
*J E Hodges*
ATTY.

3,156,433
MAGNETOHYDRODYNAMIC GENERATOR
Edward A. White, Jr., Silver Spring, Md., assignor to the United States of America as represented by the Secretary of the Navy
Filed Jan. 10, 1962, Ser. No. 165,461
7 Claims. (Cl. 244—1)

The invention described herein may be manufactured and used by or for the Government of the United States of America for Governmental purposes without the payment of any royalties thereon or therefor.

The subject invention relates to the electrical generator art and, more particularly, to a new and improved magnetohydrodynamic (MHD) generator for use as a sole or auxiliary power source in a space vehicle. As used herein, the term "space vehicle" is intended to include both re-entry and non-re-entry types of vehicles, however, the illustrated embodiments of the invention will be disclosed with particular reference to the re-entry type of vehicle.

Stationary MHD generators employing stationary ionized gas (plasma) sources have heretofore been successfully operated with various degrees of efficiency, however, the present invention constitutes a departure from this type of system in that it contemplates the incorporation of an MHD generator into a space vehicle wherein, the heat generated by the passage of the vehicle through the atmosphere ionizes the gas through which the vehicle passes, wereby the vehicle effectively acts as the plasma generator and thus supplies the MHD generator with a substantially limitless source of plasma.

Those concerned with space vehicles, and particularly those concerned with the re-entry type of vehicle, have long desired the development of a simple, light weight, efficient and absolutely fail-safe power source which, in the case of a manned vehicle, is needed to actuate various instrumentation and landing accessories and which, in the case of an unmanned vehicle, is needed to arm the warhead immediately prior to detonation. At the same time, it has long been appreciated that tremendous amounts of kinetic and thermal energy are virtually wasted by a space vehicle as it returns at high velocity through the earth's atmosphere.

One of the general objects of the present invention is to provide a unique method and means of efficiently utilizing the heretofore wasted kinetic and thermal energies to generate all or part of the needed electrical power in a space vehicle.

Another object of the present invention is to incorporate an MHD generator in a space vehicle, whereby, the naturally ionized layers of gas through which the vehicle passes may be utilized to generate electrical power.

A still further object of the present invention is to provide a new and improved source of electrical power which may be used in stationary as well as in moving systems.

Yet another object of the present invention is to provide a new and improved, self-energized, magnetohydrodynamic generator of general utility.

Other objects and advantages of the invention will become more fully apparent from the following description taken with the annexed drawings which illustrate two embodiments of the invention and wherein.

In general, MHD generators have heretofore been operated in conjunction with such staionary plasma sources as volatile liquids, carbon arcs and exhausted combustion gases with various degrees of success. In this type of stationary generator, the plasma souce is arranged in such manner as to discharge plasma through a magnetic field at an angle to the direction thereof, whereby, the electrically conductive plasma acts like the moving coil in a mechanically driven electrical generator and a potential difference is thus generated across the plasma flow path mutually perpendicular to the direction of the magnetic field and that of the plasma flow. Of course, the above description of the operation of a MHD generator is a greatly simplified one since it is only intended to provide a general background for the subject invention and, for a more detailed description of this type of generator, reference may be made to Patent No. 1,916,076 issued June 27, 1933 to E. Rupp.

Figure 1:
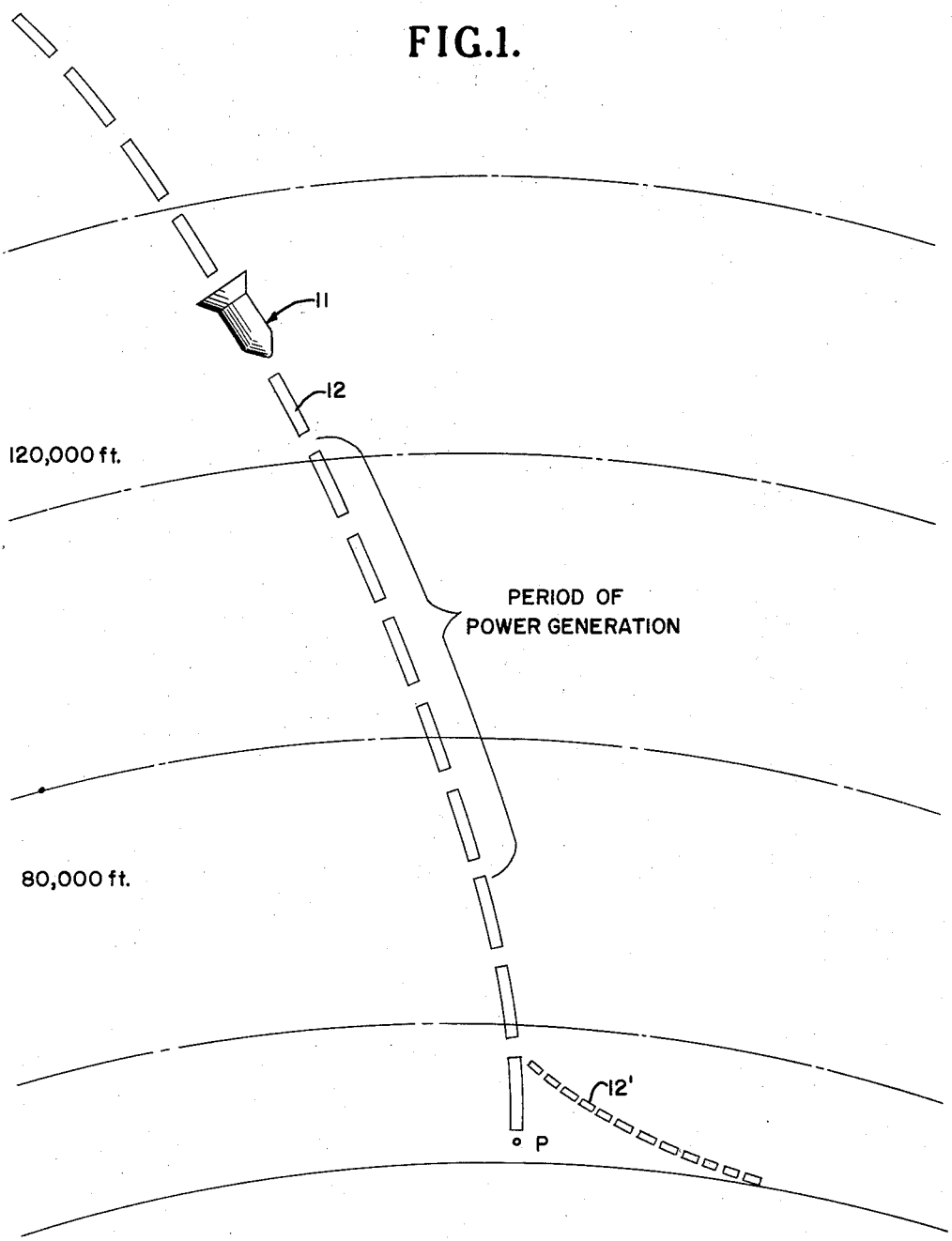
FIG. 1 shows one possible trajectory of a re-entering vehicle and the atmospheric conditions encountered therealong.

In contrast to this type of stationary generator, the subject invention utilizes the gas through which the vehicle passes and reference is therefore made to FIG. 1 which schematically illustrates one set of typical re-entry conditions wherein space vehicle 11 is shown as it executes a slightly curved trajectory path 12 a portion of which is designated as being the period of power generation, however, it is to be understood that this particular period of flight has been selected merely to illustrate one set of conditions wherein the values of the necessary parameters are presently known in order to demonstrate the operativeness of the subject invention, and it is taken to be obvious that the utility of the invention is in no way limited to the particular conditions or values thereof which have been selected solely for illustrative purposes.

First, it is well known that the most important parameter affecting the efficiency of an MHD generator is the conductivity $s$ of the gas employed which, of course, is directly proportional to the degree of ionization of the gas which, in turn, is directly proportional to both temperature, the degree of radiation present and the density of the gas. Although recent probes of the atmosphere in the 80,000 to 120,000 ft. range indicate a certain amount of ionization due to natural radiation, this factor can be largely disregarded in the case of a re-entry type vehicle since recent re-entry tests indicate vehicle skin temperatures at this altitude to be above 3,000° K. which is more than sufficient to produce a 0.1% ionization of the gaseous boundary layer flow over the vehicle which, in turn, is sufficient to give the gas a conductivity value of approximately 400 mho/meters. At the same time, these re-entry tests indicates the velocity $v_1$ of present vehicles to be in excess of 2000 meters/sec. during their descent from 120,000 to 80,000 ft. Therefore, if a nominal size MHD generator having a cross-sectional gas flow path area A of 2.8 cm.$^2$, an electrode spacing $l$ of 2.8 cm., an electrode cross-sectional area A of 6.5 cm.$^2$, and a magnetic field strength B of 5,000 gauss is assumed, the voltage, open circuit current, load current and poweer output may be easily calculated as follows:

Open circuit voltage $= V_0 = Bv_1l = 28$ volts  (1)
Short circuit current $= I_s = sABv = 260$ amps  (2)

$$\text{Power}_{max} = \frac{V_0 I_s}{4} = \frac{sAv^2B^2l}{4} = 1,820 \text{ watts} \quad (3)$$

As this point, it should also be noted that the above values of temperature and vehicle velocity are minimum values corresponding to presently known and proven re-entry vehicles and that, as new re-entry designs and new higher temperature materials are produced, the above values will be greatly increased, thus increasing the capacity and efficiency of the MHD generator used therewith. As further shown in FIG. 1, the above values are known to be present in the 120,000 to 80,000 ft. range, and therefore, the power generation period may be designed to occur only during this period by the suitable incorporation of temperature and/or pressure sensing devices which respond only to such preset values. In this manner, an automatically fail-safe arming system is easily achieved since the re-entering warhead would not be armed until it had actually executed the planned trajectory, actuated the sensing devices and produced the necessary power, which power may be applied directly to the arming circuit as it is generated or which may be stored by suitable capacitors or batteries for later use at such time as the warhead has reached a lower altitude as indicated at point P.

In order for the power source to be operative it must be subjected to a dual environment simultaneously. That is, the power source must be subjected to heat and velocity at the same time. If the device were subjected to only one environment, for example, heat from a fire, it would not operate. This provides a built in safety feature which will eliminate the need for extra safety features generally associated with a power source. Similarly, in the case of a manned vehicle, the power output may be used as it is generated or it too may be stored for later use during the approach and landing of the vehicle as indicated by the dotted line trajectory 12'.

Figure 2:
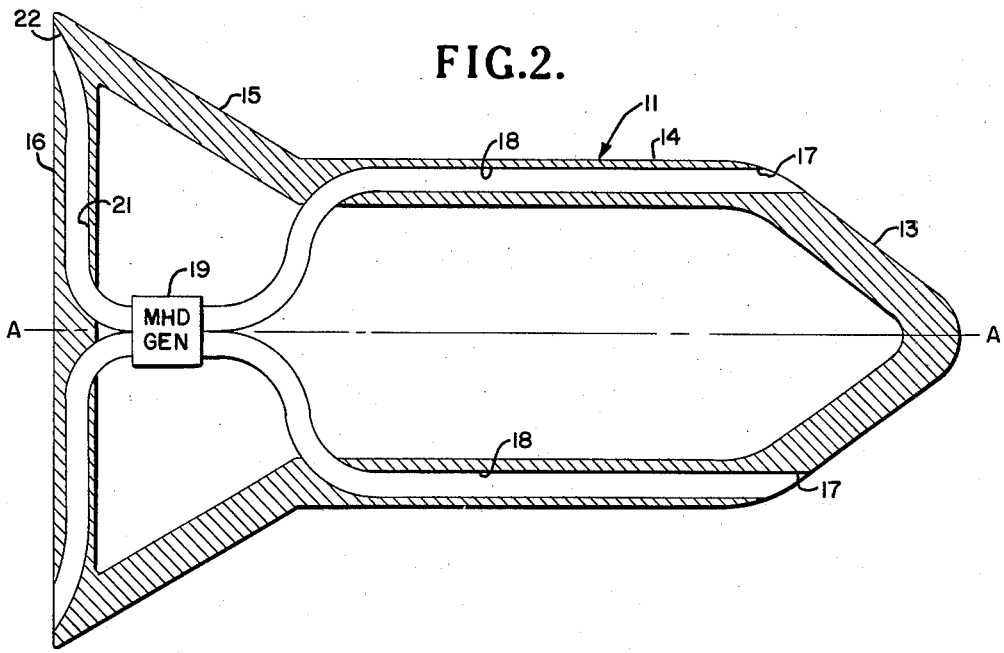
FIG. 2 is an enlarged schematic view of a first embodiment of the invention showing the incorporation of an MHD generator in an unmanned, re-entry type of space vehicle.

Referring now to FIG. 2, numeral 11 again designates the re-entry vehicle as shown in FIG. 1 which is of a typical aerodynamic shape for unmanned, warhead type vehicles. In general, vehicle 11 includes a nose portion 13, a cylindrical body portion 14 and an outwardly flaring tail portion 15, the latter portion being in the shape of an inverted, conical frustrum. Of course, it is to be understood that the subject invention is equally applicable to any space vehicle regardless of the particular aerodynamic shape thereof so long as the vehicle has surface portions which experience unequal aerodynamic pressures as it passes through the atmosphere. In the illustrated vehicle design, it is obvious that the aerodynamic pressures over the surface of nose portion 13 will be considerably greater than the pressure along trailing face 16 of tail portion 15. Thus, it will also be apparent that, as vehicle 11 plummets through the atmosphere along trajectory 12, vehicle 11 acts in a manner similar to that of a ram-jet engine wherein the boundary layer of atmosphere which flows over the extremely hot surface of nose 13 is heated and ionized thereby prior to its entry into ports 17 from which it is accelerated through ducts 18 and MHD generator 19 from which it is finally exhausted through outlet ducts 21 and outlet ports 22 to the relatively low pressure area imediately adjacent trailing face 16. In addition, the remaining boundary layer which flows over the surface of cylindrical portion 14 also produces a tremendous amount of heat which, because of the close proximity of ducts 18 to the surface, also acts to further increase the temperature of the gas prior to the entry thereof into generator 19. In this manner, a virtually limitless source of highly ionized and high velocity plasma is provided for conversion into electrical power by generator 19. In cases where the temperature of the air falls below that temperature necessary for ionization various seeding techniques may be adopted which will give the desired degree of ionization down to temperatures in the neighborhood of 1800° K. By the addition of one atomic percent of alkali metals (sodium, cesium, potassium, etc.) into the channel air stream will yield conductivities of 100 mhos/meter at such low temperatures as 2000° K. In this manner this power source is capable of operating over a longer period of time while in flight. The method of adding the alkali metals would be obvious to a person skilled in the art. For example, the air duct may be lined with such a metal or it may be injected into the air duct in the form of a liquid or mist. In addition to the above described ram-jet effect, it should also be noted that the plasma is further accelerated through ducts 18, generator 19 and exhaust ducts 21 due to the radial length of the latter ducts which exend beyond the radial position of inlet ports 17 and which, therefore, act as a centrifugal pump as vehicle 11 spins about its central axis A—A, the spin velocity thereof being in the neighborhood of 60 r.p.m. in the case of present re-entry warheads.

Figure 3:
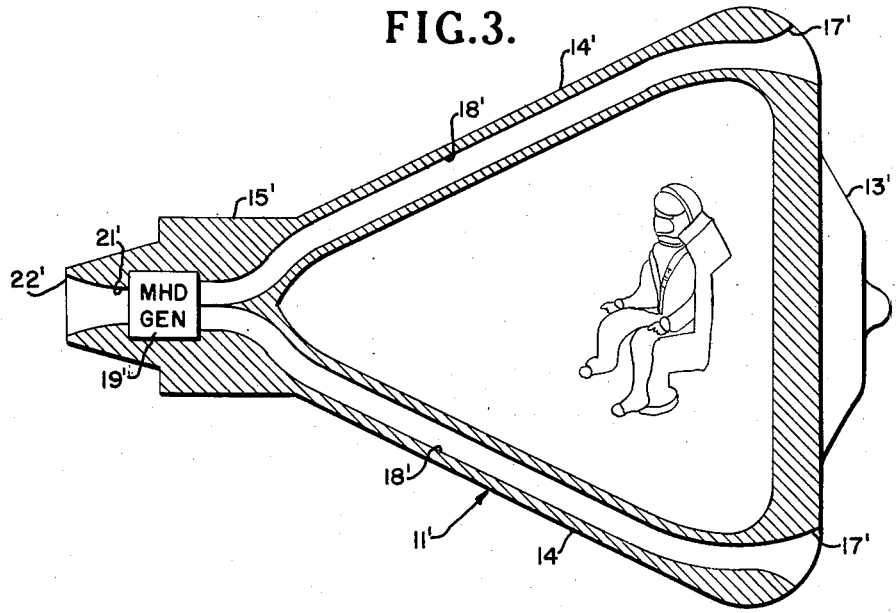
FIG. 3 is an enlarged, schematic view of a second embodiment of the present invention showing the incorporation of an MHD generator in a manned, re-entry type of space vehicle.

Referring now to FIG. 3, the subject invention is shown in combination with a manned space vehicle 11' similar in design to that of the well known Mercury capsule. It is apparent from FIG. 3 that, after flowing over nose portion 13', the heated boundary layer fluid enters ports 17' and flows through ducts 18' to MHD generator 19' from which it is exhausted through central duct 21' and port 22' to the relatively lower pressure area immediately to the rear of tail portion 15. Thus, the structure and operation of the FIG. 3 embodiment is identical to that previously described except that a single, central exhaust duct 21' is employed since manned re-entry vehicles are not normally subjected to a rotational spin upon re-entry.

Figure 4:
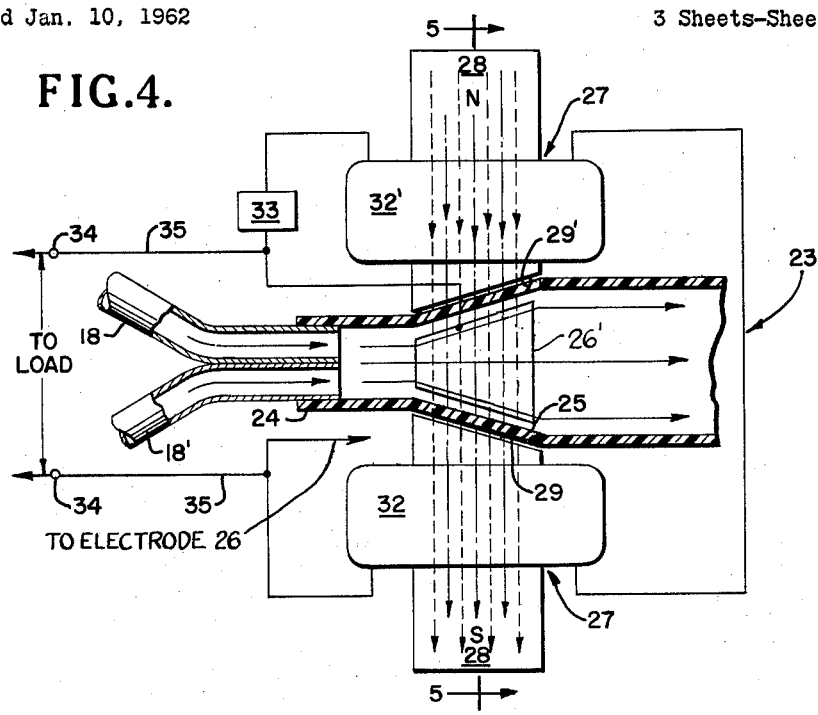
FIG. 4 is a simplified, side elevational view partly in cross-section of the self-energized MHD generator per se.
Figure 5:
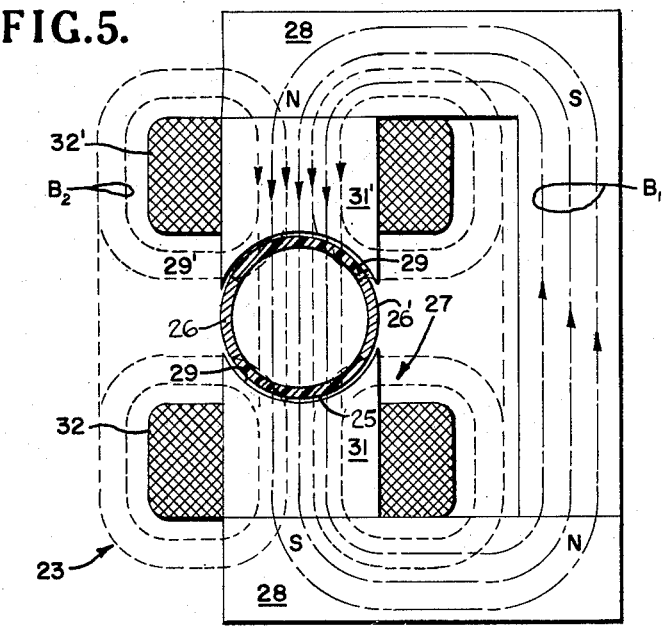
FIG. 5 is a simplified, cross-sectional view of the generator taken along line 5—5 of FIG. 4.

Referring now to FIG. 4, there is shown thereon a new and preferred type of MHD generator 23 which is particularly suitable for use in the previously described space vehicles but which is obviously not limited to exclusive use therewith. Generator 23 includes an inlet section 24 adapted to receive ducts 18, 18' or any suitable plasma flow duct such as that leading from one of the conventional plasma sources preivously described. Downstream of inlet section 24 there is provided a divergent section 25 containing electrodes 26 and 26', only electrode 26' being visible in FIG. 4, and an exhaust section which is adapted to discharge into exhaust ducts 21, 21', FIGS. 2 and 3, respectively, or other suitable discharge means. As further shown in FIGS. 4 and 5, a combination permanent and electromagnet 27 is positioned on either side of divergent section 25 such that the direction of the produced magnetic fields are perpendicular to the direction of plasma flow. Each of combination magnets 27 is shown to include a permanent type magnet 28 which may, for example, be a commercially available bar magnet such as that known as "Alnico" #5 which is capable of producing a magnetic field strength of 1,000 gauss between the diagonally opposed faces 29, 29' of soft iron blocks 31, 31' which also serve as heat sinks whereby the temperature of magnets 28 may be maintained in the order of 873° K. as opposed to the plasma temperature which is in the order of 3,000° K. In addition to the magnetic field $B_1$ produced by permanent magnets 28, blocks 31, 31' are surrounded by series connected electromagnetic coils 32, 32' which are connected to electrodes 26 and 26' through current regulator 33, electrodes 26 and 26' also being connected to output terminals 34 through leads 35 as shown in FIG. 4.

In operation, the passage of the high velocity plasma through magnetic field $B_1$ produced by permanent magnets 28 acts to generate a current $I_1$ which may be calculated to be in the order of 17 amps of which 10 amps is allowed to pass through regulator 33, thus energizing coils 32, 32' which in turn produce a second magnetic field $B_2$ in the order of 4,000 gauss which is in the same direction as field $B_1$ and therefore additive to produce a total field of 5,000 gauss. Thus, as previously set forth, the total current supplied to the load is 260 amps at a load voltage of 28 volts.

Of course, as set forth hereinbefore, the values of the varoius parameters are subject to unlimited variation dependent upon the environment and the desired output voltage and current, and the instant values have been selected for illustrative purposes merely to show an operative system for use as a 28 volt source since many electronic components presently in stock are designed to operate at this voltage.

Furthermore, as pointed out in the first paragraph herein, the instant invention is equally applicable to a non re-entry type of space vehicle wherein the passage of the vehicle through naturally ionized layers such as those encountered in the recently discovered Van Allen Belts would also serve to provide a limitless plasma source which does not require high temperature ionization since it is already ionized to a sufficient degree.

It is to be understood that the foregoing disclosure relates to only preferred embodiments of the invention and that numerous alterations and modifications may be made therein without departing from the spirit and scope of the invention as hereinafter defined in the following claims.

Having thus described the invention, what is claimed is:

1. The combination comprising; a space vehicle having a passageway therethrough extending from an inlet port to an outlet port, a load device in said vehicle to be actuated by electrical energy, and an MHD generator positioned within said vehicle, operatively associated with said passageway and connected to said load device whereby the passage of said vehicle through space causes ionized fluid to pass through said generator thereby generating electrical energy for actuating said load device, said inlet port of said passageway being located in a high pressure surface of said vehicle and said outlet port of said passageway being located in a relatively lower pressure surface of said vehicle, whereby the passage of said vehicle through space produces a ram-jet flow of said ionized fluid from said inlet port to said outlet port through said generator, said vehicle being subjected to a high velocity spin about a central axis, and said outlet port being located radially outward of said inlet port, whereby said ionized fluid is further accelerated through said generator by centrifugal pumping action.

2. The combination as claimed in claim 1 wherein said generator includes both permanent and electromagnetic field producing means.

3. The combination as claimed in claim 2 wherein said permanent and electromagnetic field producing means are arranged so as to produce additive magnetic fields.

4. The combination as claimed in claim 3 wherein the current produced by the passage of said ionized fluid through the magnetic field produced by said permanent magnetic means is supplied to said electromagnetic means to generate a second magnetic field of greater intensity than said first magnetic field.

5. An MHD generator comprising; a source of plasma, means for conducting said plasma along a predetermined flow path, means for producing a magnetic field through and at an angle to said flow path, said magnetic field producing means including both permanent magnets and electromagnets arranged such that the current produced by the passage of said fluid through the field produced by said permanent magnets is applied to said electromagnets in a manner to increase said magnetic field.

6. An electric power supply for a space vehicle having a passageway therethrough through which ionized gas may be passed, comprising a magnetohydrodynamic generator disposed within said vehicle, said magnetohydrodynamic generator comprising:

magnet means for establishing a magnetic field transversely across said passageway, electrodes disposed in the wall of said passageway, and leads extending from said electrodes to a load in said vehicle, whereby the motion of the vehicle through the atmosphere during re-entry will cause ionized gas to pass through said vehicle and produce an electric current in said leads.

7. A magnetohydrodynamic power supply for a re-entry vehicle, said re-entry vehicle having a passageway extending from an inlet port located in a high pressure surface of said vehicle to an exhaust port located in a relatively lower pressure surface of said vehicle, comprising:

a permanent magnet having pole pieces disposed at diametrically opposite sides of said passageway for establishing a magnetic field transversely across said passageway, a pair of electrodes disposed at opposite sides of said passageway, a winding on each of said pole pieces, leads extending from said electrodes to each of said windings for sending at least part of the current from said electrodes to said windings to establish a supplementing magnetic field across said passageway, whereby re-entry of said vehicle into the earth's atmosphere will cause hot ionized atmospheric air to pass through said passageway, inducing a current in said leads.

References Cited in the file of this patent

UNITED STATES PATENTS 3,040,618   Hokett _____ June 26, 1962
3,123,323   Wise _____ Mar. 3, 1964

OTHER REFERENCES

Astronautics, October 1958, pages 18, 19, 20, 74, 75.
Aviation Week, June 1961, pp. 54, 55, 59, 61, 62.